United States Patent
Hiles

[11] Patent Number: 6,073,902
[45] Date of Patent: Jun. 13, 2000

[54] SUPPORT POD FOR CAMERA

[76] Inventor: Andrew F. Hiles, 801 18th St., Boulder, Colo. 80302

[21] Appl. No.: 09/054,616

[22] Filed: Apr. 3, 1998

[51] Int. Cl.[7] .................................................. G03B 17/00
[52] U.S. Cl. .................................. 248/346.2; 248/176.1; 396/419
[58] Field of Search ................................ 248/118, 118.1, 248/346.2, 346.01, 346.3, 176.1; 396/419, 428; D6/601; 5/640; 446/369

[56] References Cited

U.S. PATENT DOCUMENTS

| | | | |
|---|---|---|---|
| D. 312,650 | 12/1990 | Charrier | 248/346.2 X |
| D. 402,493 | 12/1998 | Cothren et al. | D6/601 X |
| 3,704,848 | 12/1972 | Trebes et al. | 248/346.3 X |
| 4,138,079 | 2/1979 | Ehret et al. | 248/346.01 X |
| 4,162,696 | 7/1979 | Sprung | 206/316.2 |
| 4,606,524 | 8/1986 | Conee | 248/346.06 |
| 5,027,141 | 6/1991 | Bowers | 396/419 |
| 5,350,147 | 9/1994 | Paganus | 248/346.2 |
| 5,445,349 | 8/1995 | Hart | 248/118 |
| 5,528,784 | 6/1996 | Painter | 5/640 |
| 5,810,313 | 9/1998 | Armstrong | 248/346.2 |
| 5,897,421 | 4/1999 | Rink et al. | 446/369 |

OTHER PUBLICATIONS

Pillow Talk:, Butterick Patterns Inc., p. 2493, Oct. 1979.
"Alpha Critters", Playthings magazine, p. 79, Mar. 1986.

*Primary Examiner*—Derek J. Berger
*Attorney, Agent, or Firm*—Douglass F. Vincent

[57] ABSTRACT

A T-shaped cushion pod for supporting a camera includes a cushion for supporting the camera. The pod has a fluid material contained within the cushion, and a tongue portion and a base portion of said cushion together forming a substantially "T"-shaped configuration. The pod has a zipper for allowing easy access to the fluid material contained within the cushion, for maintaining the level of fluid material within the cushion at an optimum level significantly below the maximum capacity of the cushion. In this way, the T-shape will act to retard migration of fluid material between the tongue and the base portions of the cushion, thereby causing the pod to hold its shape and provide sustained aiming for a camera resting thereon.

4 Claims, 2 Drawing Sheets

SUPPORT POD FOR CAMERA

TECHNICAL FIELD

This invention relates to camera supports, and more particularly, to a cushion for supporting a camera on regular or irregular surfaces without the use of a conventional tripod.

BACKGROUND ART

Taking photographs often requires stabilizing the camera, especially when photographing at low light levels, or when using a timer. This has traditionally been accomplished using a tripod; however, a tripod has several limitations. First, it must be set up, which takes time and may result in losing a photo opportunity. Second, a tripod requires a flat area to anchor each of its three legs. This can pose an insurmountable obstacle on particularly irregular surfaces. Finally, tripods can be cumbersome, making them awkward to transport.

The prior art teaches the use of a cushion to stabilize a camera. For example, in U.S. Pat. No. 4,606,524, Conee teaches a cushion filled with free flowing particulate and means to maintain the cushion's shape. Likewise, in U.S. Pat. No. 4,162,696, Sprung teaches a bag to support the camera which also forms a camera case. These inventions partially overcome the shortcomings of tripods because they eliminate set-up time, and enable the user to place the camera on irregular surfaces.

U.S. Pat. No. 5,350,147 to Paganus provides an omnipositional pod for supporting a camera. The pod of Paganus is generally rectangular or oval in shape, and is filled with fluid material comprising free flowing solid particles. The generally rectangular shape of the Paganus pod, however, does not provide optimum support for the lens portion of a conventional camera. Further, the uniform rectangular or oval shape of Paganus results in a tendency of the internal flowing particles to return to the general shape of the pod, regardless of whatever shape the pod may have been manipulated into. While this tendency to resume its usual shape makes the Paganus pod stable once it has settled, it also makes it more difficult to manipulate the pod into a desired shape which may be maintained sufficiently over time, to improve the aim of a camera.

Based on the foregoing, there is a need for a camera support pod which will provide several useful features. The pod would provide optimal support for the camera lens, in order to facilitate aiming. A related feature of the pod would be that it would be easily manipulated into a desired shape to facilitate aiming of the camera, and would thereafter tend to hold the selected shape over time, so that the aim of the camera does not appreciably change. Finally, there is also a need for a cushion support for a camera which is suitable for supporting a camera on a thin surface such as a car window edge. For example, camera users often desire to shoot pictures from a car, and want to rest the camera lens on the glass pane of a partially opened car window. Without a cushion, such a surface is too hard, and may cause vibration if the car is moving or even if the car engine is running. Additionally, currently used support cushions have a tendency to slip off of a car window when used for support thereon.

DISCLOSURE OF THE INVENTION

In accordance with this invention a cushion pod for supporting a camera is provided. The cushion pod has an upper portion and a lower portion, and is filled with a fluid particle material such as styrofoam beads or similar materials. The pod has a tongue portion and a base portion, which together form a substantially "T"-shaped configuration, which is ideal for supporting a conventional camera. Alternatively, an offset "T"-shape may be used, for supporting a camera which more closely resembles such a shape. The "T" may even be so fully offset as to produce an "L"-shaped pod.

A slip-resistant material, such as neoprene, may be used for the lower portion of the pod. This non-slip lower surface allows the pod to be securely used on any irregular or slippery surface without slipping. In particular, such a non-slip lower portion makes the pod ideally suitable for draping over the edge of an open car window to support a camera thereon.

Based on the foregoing, several advantages of the present invention may be seen. A convenient camera support pod is provided which will provide several useful features. The pod provides optimal support for the camera lens, in order to facilitate aiming. A related feature of the pod is that it is easily manipulated into a desired shape to facilitate aiming of the camera, and hereafter tends to hold the selected shape over time, so that the aim of the camera does not appreciably change. Finally, the pod provides cushion support on sharp-edged surfaces such as car windows with a reduced tendency to slip off of the surface.

Additional advantages of this invention will become apparent from the description which follows, taken in conjunction with the accompanying drawings.

BEST MODE FOR CARRYING OUT THE INVENTION

Figure 1:
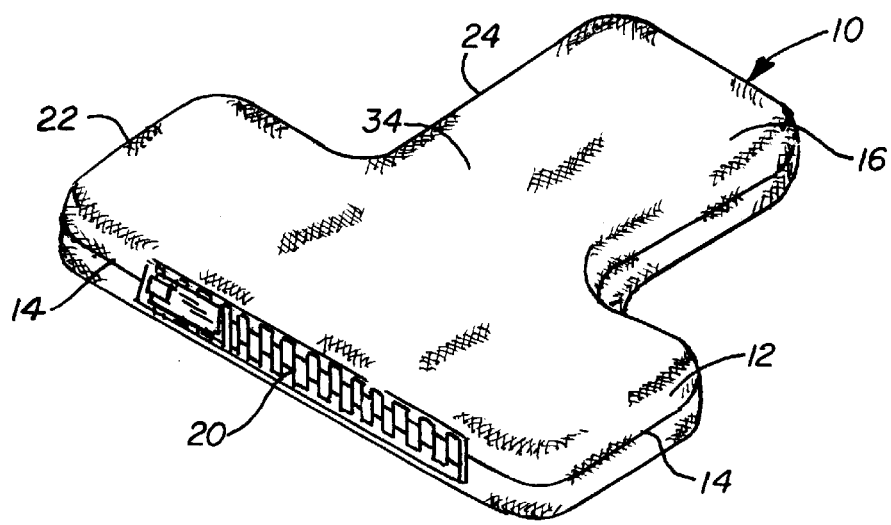
FIG. 1 is a perspective view of one embodiment of the support pod of the present invention, showing its "T"-shape, and its upper and lower halves.

Referring now to the drawings, as best depicted in FIG. 1 there is shown a support pod 10 according to the present invention. The pod 10 has an upper portion 12 and a lower portion 14. Upper portion 12 has an upper surface 16, while lower portion 14 has a corresponding lower surface 18. The pod is similar to a traditional "bean bag," and is filled with fluid moveable particle materials, such as styrofoam beads (not shown). Alternative materials include gels, sand, pebbles, air, or organic materials such as rice or millet. Optional zipper 20 allows the pod 10 to be opened and filler material added or removed. In this way, the firmness of the pod 10 may be adjusted to a desired level, and filler materials may also be replaced if worn out or damaged.

The pod 10 is generally "T"-shaped, and has a base portion 22 and a tongue portion 24. While a "T"-shape is usually preferable, other offset shapes might be used, with the main criteria being that the shape conform to the shape of a camera to be supported. This would typically require that the pod have a tongue portion and a base portion. For example, an "L"-shape might be effectively used to support a camera which generally has such a shape itself. With an "L"-shaped pod, a tongue and a base would be provided, although the "tongue" might be generally equivalent to the "base." Similarly, an offset "T"-shape could be employed, in which the tongue would not extend from the general center line of the base, but rather would extend from a point offset to one side of the center line of the base. Many cameras have such a general configuration, and the general "T"-shape of the pod is intended to encompass such variations from a strictly "T"-shaped pod.

Figure 2:
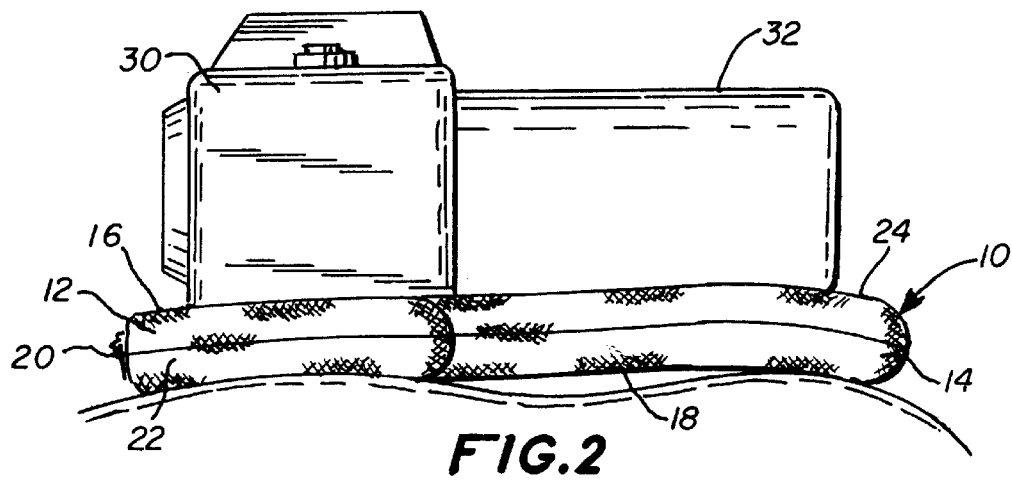
FIG. 2 is a side elevational view of the pod positioned on a rough surface and supporting a camera.
Figure 3:
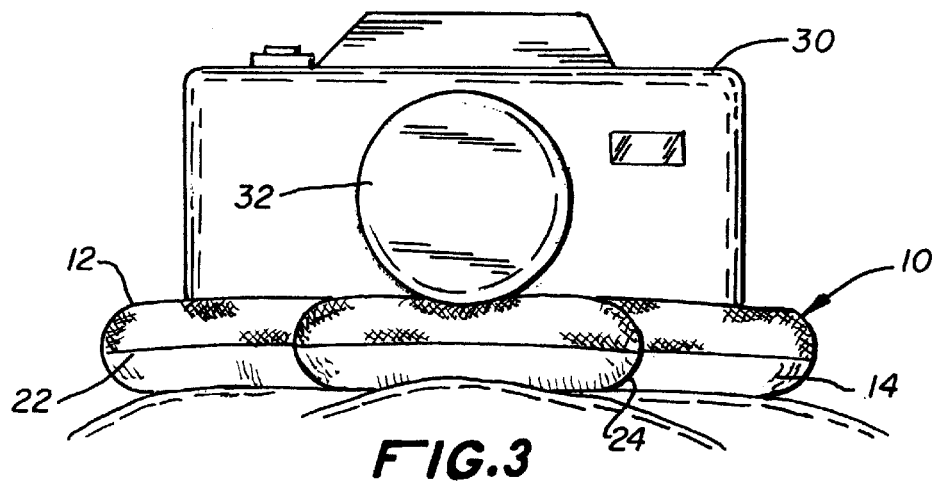
FIG. 3 is a front elevational view of the pod and camera resting on a rough surface as depicted in FIG. 2.

Referring now to FIGS. 2 and 3, a pod 10 is shown supporting a camera 30, with the lens 32 of the camera 30 positioned on the tongue 24 of the pod 10 for optimal aiming and support. The pod 10 is shown resting on a rock or other irregular surface 34, to which the pod 10 generally conforms. This ability of the pod 10 to conform to the irregular surface 34 offers greatly improved stability and cushioning for the camera 30. The general "T"-shape of the pod also improves the aiming capabilities of the pod over generally oval or rectangular support pods. This improvement occurs so long as the pod is not over-filled, due to the fact that filler material may be selectively moved out of the tongue 24 and into the base 22, or into the tongue and out of the base, by simply manipulating the pod manually. The general intersection 34 between the tongue 24 and base 22 then serves as a partial "bottleneck" between those two portions of the pod, thereby restricting migration of the materials between the two portions. For these reasons, the pod 10 will retain its shape better than generally oval or rectangular shaped pad.

Figure 4:
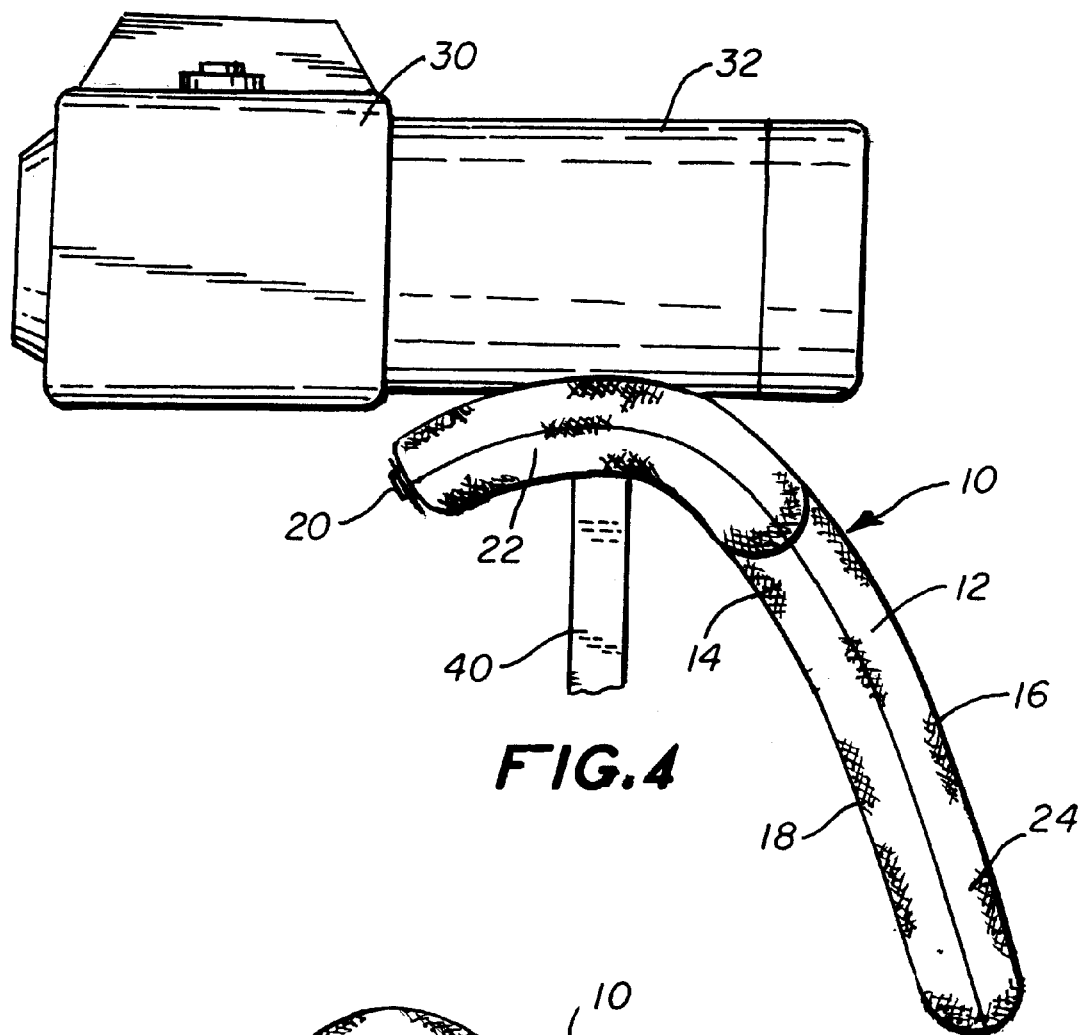
FIG. 4 is a perspective view of the pod supporting a camera while draped over a partially opened car window.

Typically, the upper surface 16 and lower surface 18 are made of nylon or other durable material. Optionally, lower surface 18 may be made of neoprene or other non-slip material. This non-slip feature may provide added stability when the pod is used on any irregular surface, as depicted in FIGS. 2 and 3. Referring to FIG. 4, however, the pod 10 is depicted draped over a car window 40. In a use such as this, it is important that a suitable non-slip material be provided on the lower surface 18 for stability. Without a non-slip material on the lower surface 18, the pod will tend to slip in such a use, thereby diminishing both the stability and the cushioning offered to the camera 30. Even further, both the upper and lower surfaces 16,18 may be made of nonslip material. This provides additional stability as it further prevents the camera itself from slipping relative to the pod. The problem with such an optional use of non-slip material is that such materials tend to be significantly more expensive to use in the pod, both in per unit costs of the material and in costs of manufacturing the pod.

Figure 5:
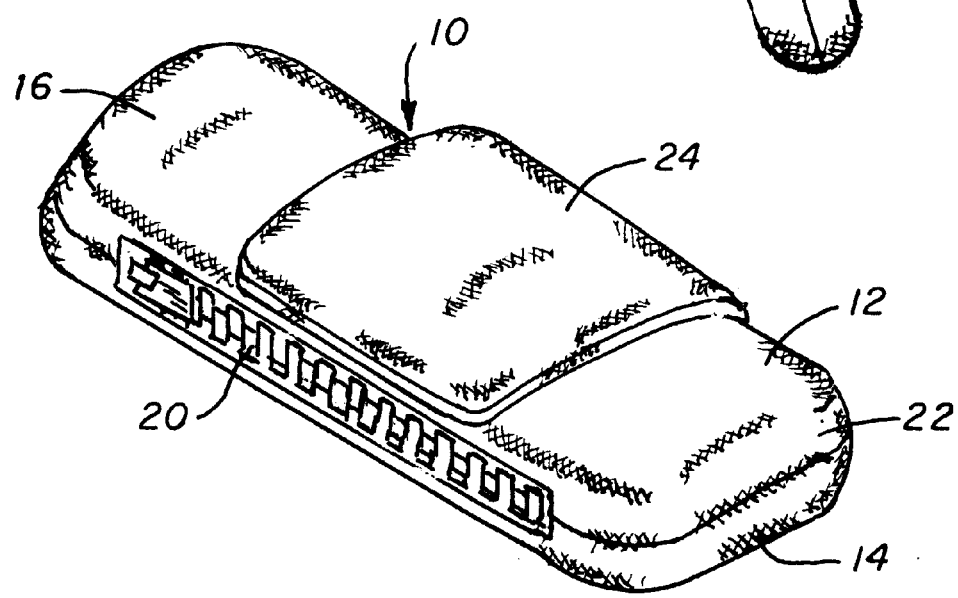
FIG. 5 is a perspective view of the pod showing the tongue deflated and folded back over the base for storage or portability.

Referring now to FIG. 5, there is depicted another useful feature of the pod 10. When the pod is filled to a typical level of firmness, the tongue 24 may be deflated and folded back over the base 22 for ease of storage and portability. Depending upon the degree of filling employed, as well as upon the relative dimension of the base 22 and the tongue 24, it may also be possible to deflate the base 22 and fold it back and wrap it around the tongue 24.

Based on the foregoing, a number of advantages of the present invention are readily apparent. A camera support pod is provided which provides support for a camera, either for resting purposes such as merely setting the camera down on a rock, or for aiming purposes, or for both purposes. The pod may be easily manipulated into a desired shape to facilitate aiming of the camera, and thereafter tends to hold the selected shape so that the aim of the camera does not appreciably change. Additionally, a pod is provided which will provide cushion support on sharp-edged surfaces such as car windows with a reduced tendency to slip off of the surface. The pod also has an optional zipper, which allows filler material to be added or removed by the user, either for maintenance and repair or to adjust the firmness of the pod.

This invention has been described in detail with reference to a particular embodiment thereof, but it will be understood that various other modifications can be effected within the spirit and scope of this invention.

I claim:

1. In a combination including a camera resting on a cushion support pod, the support pod comprising:

a cushion for supporting the camera, said cushion having an upper portion and a lower portion;

a fluid material contained within said cushion;

a tongue portion and a base portion of said cushion together forming a substantially "T"-shaped configuration.

2. The combination as claimed in claim 1, further including:

a zipper on said cushion pod to allow opening and closing of the pod to provide access to said fluid material.

3. In a combination including a camera resting on a cushion support pod, the support pod comprising:

a cushion for supporting the camera, said cushion having an upper portion and a lower portion;

a fluid material contained within said cushion;

a tongue portion and a base portion of said cushion together forming an offset "T" configuration.

4. The combination as claimed in claim 1, further including:

a zipper on said cushion pod to allow opening and closing of the pod to provide access to said fluid material.

* * * * *